United States Patent [19]

Lüchinger et al.

[11] Patent Number: 4,789,034
[45] Date of Patent: Dec. 6, 1988

[54] ANALYTICAL BALANCE

[75] Inventors: Paul Lüchinger; Heinz Rutishauser, both of Uster; Hanspeter Wachter, Dübendorf, all of Switzerland

[73] Assignee: Mettler Instrumente AG, Switzerland

[21] Appl. No.: 148,128

[22] Filed: Jan. 26, 1988

Related U.S. Application Data

[63] Continuation-in-part of Ser. No. 899,926, Aug. 25, 1986.

[30] Foreign Application Priority Data

Sep. 18, 1985 [CH] Switzerland ............... 4056/85

[51] Int. Cl.⁴ .................... G01G 23/18; E05F 15/20; E05F 11/00
[52] U.S. Cl. ........................ 177/181; 49/25; 49/360
[58] Field of Search ............... 177/180–182, 177/190; 49/25, 31, 340, 349, 360

[56] References Cited

U.S. PATENT DOCUMENTS

| | | | |
|---|---|---|---|
| 2,468,453 | 4/1949 | Mallentjer | 49/360 X |
| 2,614,825 | 10/1952 | Kadlec et al. | 177/181 |
| 4,084,149 | 4/1978 | Driver et al. | 49/25 X |
| 4,156,472 | 5/1979 | Kunz . | |
| 4,208,695 | 6/1980 | Noda et al. | 49/25 X |
| 4,621,452 | 11/1986 | Deeg | 49/25 X |
| 4,700,793 | 10/1987 | Luchinger | 177/181 |

FOREIGN PATENT DOCUMENTS 0461121 10/1968 Switzerland .
0559901 3/1975 Switzerland .

Primary Examiner—George H. Miller, Jr.
Attorney, Agent, or Firm—Toren, McGeady & Associates

[57] ABSTRACT

The moving housing parts of an analytical balance are couplable with drive apparatus, which receives the appropriate control commands for opening or closing, for instance, from sensors operating in a contactless fashion. Proximity sensors or voice control sensors can be utilized as sensors. The mechanical process of the opening-or closing movement occurs by means of a drive housed in the housing.

11 Claims, 2 Drawing Sheets

ANALYTICAL BALANCE

This is a continuation-in-part of application Ser. No. 899,926, filed Aug. 25, 1986.

FIELD OF THE INVENTION

The subject of the present invention is an analytical balance with a weighing space enclosed by movable housing parts. The term "analytical balance" is meant to comprise balances known in the weighing art also as e.g. macro, half-micro, micro, and ultra-micro balances, as well as some types of precision balances, most of which are usually found in laboratories.

BACKGROUND OF THE PRIOR ART

When weighing a substance on an analytical balance with a closable weighing space, one of the movable housing parts has to be opened and subsequently closed again for charging of the balance. For a single measuring-out of a weighing commodity, for instance with a spatula, at least fifteen handling steps have to be accomplished in the case of known balances. That is, a housing part (window) must be opened, the receptacle has to be positioned on the balance dish, the housing part must be closed, the taring operation has to be accomplished, the spatula has to be picked up, the weighing commodity must be put on the spatula, the housing part has to be opened, the commodity has to be measured out, the spatula to be removed from the weighing space, the air current guard must be closed, the result has to be awaited, the air current guard must be opened, the receptacle has to be removed and the air current guard closed again.

The opening and closing of the air current guard, six times in total, requires always putting away either the receptacle or the spatula, both of which implements are already in the hands of the operator at the start of the weighing process and which he has to put down again after the termination of the weighing process. The handling steps are cumbersome and time-consuming, since the hand that also holds the spatula must regularly open the weighing space and close the same.

From the Swiss patent publication No. 559 901, a balance is known, in which the two side housing parts (sliding windows) are connected with each other through a coupling arrangement for synchronously opening and closing, whereby the operation is possible with the left as well as the right hand. It is achieved in this manner that one hand respectively remains free for an additional manipulation or for holding of an object, so that the sliding window can simultaneously be opened with the other hand.

This known device does not offer a solution for the thorough reduction of the handling steps.

The present invention is based on the task of doing away with the shortcomings in the operation of an analytical balance and to free the operator from the manual opening and closing of the movable housing parts.

SUMMARY OF THE INVENTION

The invention solves this problem with motor driven housing parts, in which at least one of the moving parts can be coupled with a drive, whereby the drive can be controlled by a sensor working in a contactless fashion.

The advantages thus achieved consist essentially therein, that the operator can cause the opening and closing of the housing parts without contacting or touching the same, meaning he does not have to make the handles available for this purpose. Thus, it is possible to do without six working steps in each tare process and a possible contamination of the scale and/or of the commodity to be weighed or of the spatula during the intermediate placing on the working table is avoided.

Other advantageous embodiments are disclosed. Thus, for instance, the opening and closing with a voice control sensor can not only be triggered in different languages or with different words, but additional functions can also be initiated, for instance, the taring operation, without having to make one hand available for this purpose.

For a better understanding of the present invention, reference is made to the following description and accompanying drawings, while the scope of the present invention will be pointed out in the appended claims.

DESCRIPTION OF THE PREFERRED EMBODIMENT

Figure 1:
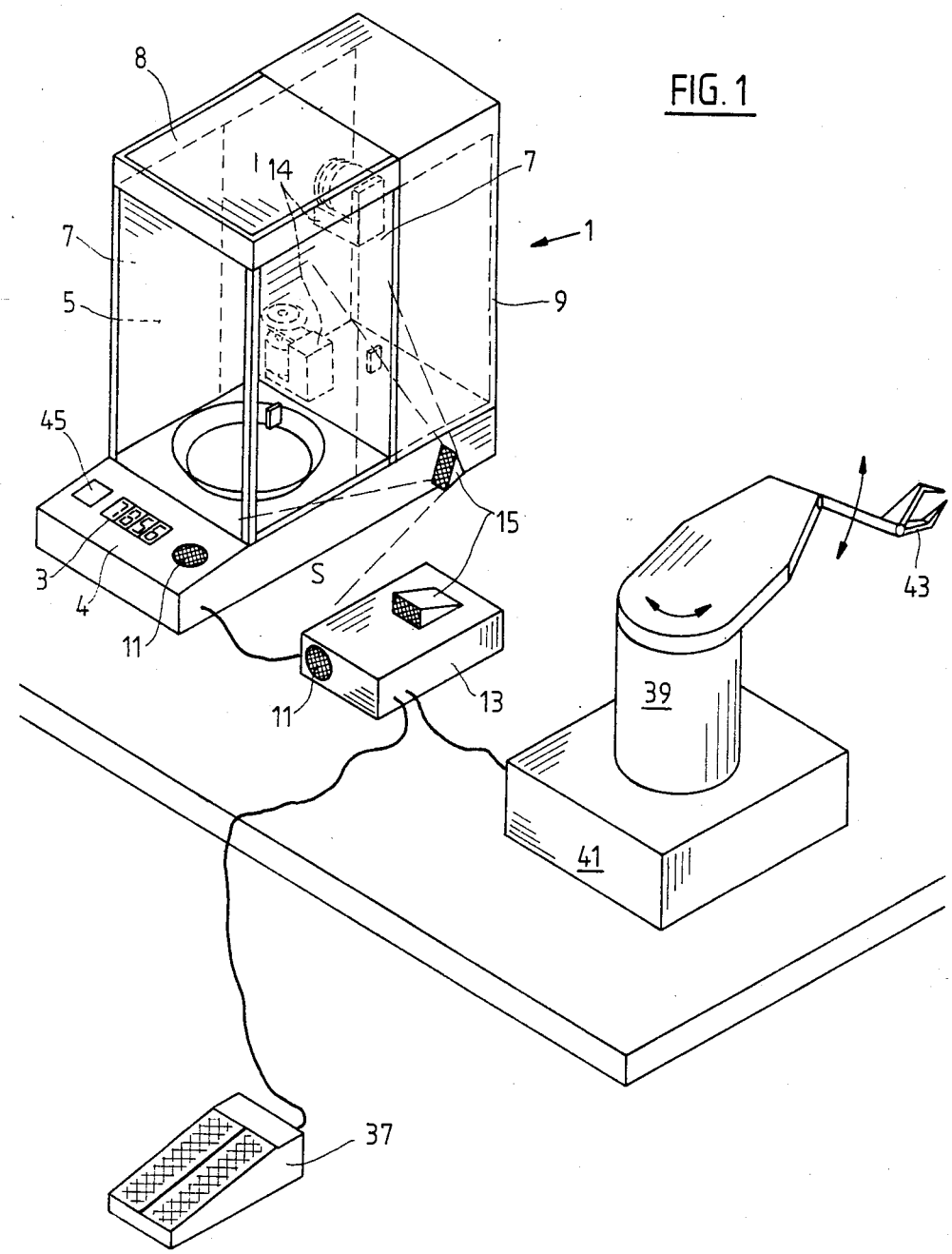
FIG. 1 presents a schematic presentation of a balance.

Depicted in FIG. 1 are an analytical balance 1 with a display field 3 on an operator's console 4, a weighing space 5 and two movable housing parts 7 that enclose the weighing space 5 from the sides, a housing part 8 that covers the weighing space 5 from above, and a housing 9 with the mechanical and electronic apparatus of the analytical balance 1. On the front side of the balance 1, a voice commercially available control sensor 11, for instance a microphone, is inserted, that is connected with a computer 13 that processes voice commands and converts these into control sequences for the energy supply of a drive 14 of the housing part 7 and the tare operation, among other things.

Instead of the voice control sensor 11 or in addition to the same, a proximity sensor 15, for instance, an infrared or ultrasonic sensor, can be attached at the analytical balance 1. Preferably its receiving span is limited to a specific sector S, in order that the signals for actuation of the housing part 7 or 8 are only triggered precisely when an object, for instance the hand, the commodity to be weighed or the gripper 43 of a robot 38, enters into the sector S. The signals are not triggered, however, when other activities in the area of the balance, for instance at their operating console 4, are performed. The infrared sensor responds to the warmth of the hand not, however, to the objects that enter into its sensing range.

The voice control sensor 11 and/or proximity sensor 15 can naturally also be arranged on a support independent of the balance housing, for instance, on the computer 13.

In accordance with a preferred embodiment of the invention, an acoustic sensor is used. Specifically, a "Speech Recognizer" SYS 300 (Voice Recognition System) including microphone manufactured by and commercially available from Interstar Electronics Corp. is mounted in the analytical balance 1 according to the present invention. This sensor is connectable through a standardized RS 232 interface to any compatible, appropriately programmed computer which, in turn, generates the control commands. The computer can be programmed by those skilled in the art without difficulties.

The movable housing parts 7 and 8, usually fabricated from glass, are supported to be easily displaceable in a conventional fashion in guide grooves in the housing 9.

The housing parts 7 and 8 can be brought into connection with drives 14 (depicted as friction wheel drives). Each housing part 7 or 8 is moved towards the rear for opening of the weighing space 5 and towards the front in order to close the same, whereby the respective drive 14 is connected in a frictionally locking manner during the sliding operation with respect to the housing part 7 or 8 and can be decoupled from the same, as soon as the respective end position "opened" or "closed", has been reached.

Figure 2:
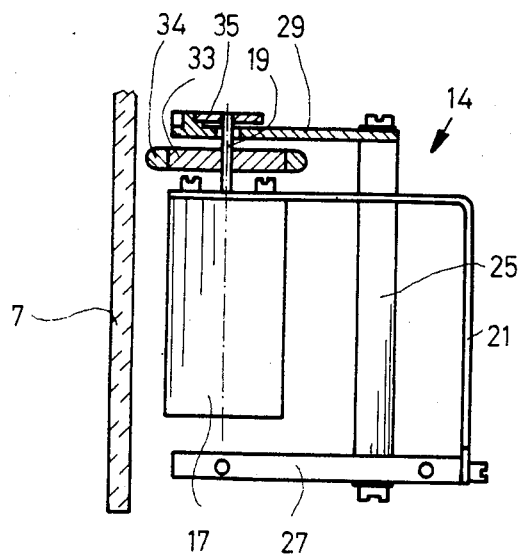
FIG. 2 illustrates a side view of a drive for a housing part.
Figure 4:
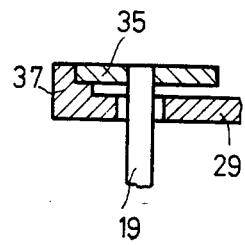
FIG. 4 illustrates a detail of the drive.
Figure 3:
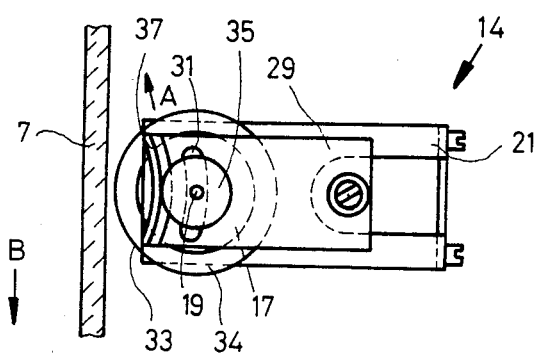
FIG. 3 shows a horizontal projection of the drive in FIG. 2.

An embodiment example of a decouplable drive 14 is depicted in FIGS. 2-4.

The drive 14 consists essentially of a commercially available electric motor 17 that is attached at a spring 21 designed in an angularly shaped fashion. An electric motor advantageously used in drive 14 may be a DC-micromotor of the type minimotor 1616-006S with integrated gear assembly 141:1. Parallel to the rotor shaft 19 of the electric motor 17, a bolt 25 is rigidly connected with a baseplate 27, at which also the spring 21 is threaded on. At the upper end of the bolt 25, a guide plate 29 with a V-shaped guide slit 31 is attached, through which the rotor shaft 19 protrudes. A metallic friction wheel 35 sits on the rotor shaft 19 above the guide plate 29, and below the guide plate 29 there is located a friction wheel 33 equipped with a rubber coating or with an O-ring 34. The diameter of the friction wheel 33 is larger than that of the friction wheel 35.

The width of the guidance slit 31 is greater than the diameter of the rotor shaft 19. Because of the tensile force of the spring 21, the friction wheel 35 rests in the neutral original position at a web 37 (FIG. 4) extending parallel to the guidance slit 31; the friction wheel 33 does not contact in this position the adjacent housing part 7 (FIG. 3).

The baseplate 27 of each drive 14 is attached to the housing 9 of the balance 1, and the electric motor is connected with the computer 13.

A balance 1 equipped wit a sensor 11 or 15, working in a non-contact fashion, is operated in accordance with the following description.

If the balance 1 exhibits a stand-by switching condition for the computer 13, the balance can be switched on by a code word correspondingly stored in the computer 13 or spoken. Subsequently, the housing part and/or both housing part 7 or 8 can be opened by an additional code word, for instance "open" or "opened", and the measuring out operation can be performed. The housing part 7 or 8 is closed again with the code word "close" or "closed" and the weighing operation is performed.

In the case of a scale with a proximity sensor 15, the opening occurs at the approach to the movable housing part 7 or 8, and the closing occurs after the hand of the operator and/or the tool, for instance the spatula, has been removed from the sensitive areas.

It is also possible to trigger the tare operation of the balance by voice command, for instance "Tara". Naturally, instead of commands in the German language, such orders in other languages and further orders in different voice shades (women's voices or men's voices) can be inserted.

Naturally, a foot pedal 37 can also be utilized for triggering these commands.

Instead of command triggering by means of sensors 11 or 15 or by the foot pedal 37, signals of the computer 41 controlling the robot 39 can be utilized. Such a control system enables an issue of commands for opening the housing part 7 or 8 prior to the gripper 43 of the robot 39 beginning to move towards the weighing space 5, whereby the waiting periods with the balance 1 can be avoided or the working period can be shortened.

For the manual operation of the electrical drive 14, a soft key 45 can be provided on the operator console 4 of the balance 1, on which, for instance, "open" is illuminated when the weighing space 5 is "closed" and "closed" is illuminated when the weighing space is "open". The operator is cognizant in this manner at all times which is the next step. This can particularly be important, then, if the housing part 7 or 8 is respectively only opened to such an extent as this happens to be required. A partial opening can be especially of advantage, then, when the charging of the balance occurs by means of a robot.

After the evaluation of the signals supplied by the sensor 11 or 15 to the computer 41, the foot pedal 31 or the soft key 45 to the computer 13, the computer starts the electromotor 17 in the appropriate direction of rotation. The friction wheel 35 rolls hereby on the web 37 and moves the elastically suspended electromotor 17 in the case of positive direction of rotation (counterclockwise) in the guidance slit 31 in the direction of the arrow A. The friction wheel 33 now comes into frictional contact with the housing part 7 or 8 and moves the same in the direction of the arrow B. As soon as the energy supply to the electromotor 17 is again interrupted, the elastic energy stored in the compressed o-ring during the drive process presses the friction wheel 35 back into its original position, and simultaneously the frictionally locked friction connection with the housing part 7 or 8 is interrupted so that the housing part 7 or 8 can be operated by hand.

The opening and closing of the housing part 7 or 8 can occur, respectively, individually or in common, in such a way that, respectively, a vertical housing part 7 is actuated together with the horizontal housing part 8 or, if this is possible, with the housing part that lies in front, provided the driving apparatus is appropriately adapted.

The sensor operating in a contactless manner can also be embodied in storage states of a computer. At appropriate points of a program sequence that has been put in or that can be put into a computer, the computer then recognizes that it now has to put out a control signal for opening or closing. This variant is particularly significant in the case of sophisticated systems, for instance, for routine series weighing. Said appropriate points of the program sequence may e.g. reflect completion of a taring operation or completion of a printout of a weighing result, whereafter normally the housing part is to be opened again for enabling the next handling step. In such cases, with control signals generated by the program, the voice-control sensor and/or the proximity sensor can be supplemented or even dispensed with.

While the foregoing description and drawings represent the preferred embodiments of the present invention, it will be obvious to those skilled in the art that various changes and modifications may be made therein without departing from the true spirit and scope of the present invention.

What is claimed is:

1. In an analytical balance with a weighing space which can be closed by moving housing parts, the improvement comprising that the balance includes a drive and a sensor and that at least one of the moving housing parts is couplable with said drive, wherein the drive can be controlled by said sensor, said sensor operating in a contactless fashion.

2. An analytical balance according to claim 1, wherein said sensor is a proximity sensor, which if an object or the hand of the operator approaches a movable housing part, sends a control sequence for opening or closing of the housing part or the housing parts to a computer or a drive.

3. An analytical balance according to claim 1, wherein the operating range of the sensor is limited spacewise to affect a sector S in the area of a movable housing part.

4. An analytical balance according to claim 1, wherein said sensor is a voice control sensor that recognizes specific spoken word commands and sends an appropriate control sequence for opening or closing of a movable housing part or the housing parts to a computer or the drive.

5. An analytical balance according to claim 4, wherein the sensor includes means for recognizing spoken word commands for triggering an appropriate control sequence for the tare operation of the balance.

6. An analytical balance according to claim 4 or 5, wherein internal structure of the speech recognition word base recognizes the spoken command in several languages and/or that the spoken command can be preset by the operator prior to beginning work with the balance.

7. An analytical balance according to claim 1, including means for decoupling the drive from the housing part when not in operation or during the weighing and for coupling the drive to the housing part for opening or closing of the housing parts.

8. An analytical balance according to claim 7, wherein the drive comprises an electric motor that is couplable to the housing parts for displacing the housing parts.

9. An analytical balance according to claim 8, wherein the electromotor is supported in a V-shaped guidance slit and is displaceable in the guidance slit by a friction wheel attached to the rotor shaft of the electric motor in such a way that a friction wheel attached to the rotor shaft can be pressed against the housing part with an O-ring 34 installed on the friction wheel.

10. An analytical balance according to claim 9, wherein the electromotor is suspended pivotably by a spring.

11. An analytical balance according to claim 1, wherein the sensor operates in a contactless fashion and includes means for entering sensor information into storage states of a computer and also includes means for interrogating said storage states in accordance with a preset program.

* * * * *